United States Patent [19]

Wendland et al.

[11] Patent Number: 4,947,243

[45] Date of Patent: Aug. 7, 1990

[54] METHOD OF AND ARRANGEMENTS FOR CODING AND DECODING COLOR TELEVISION SIGNALS USING A SEPARATE SERIES ARRANGEMENT OF A LOW-PASS FILTER AND A VERTICAL TEMPORAL FILTER FOR EACH COLOR DIFFERENCE SIGNAL

[75] Inventors: Broder Wendland, Waltrop; Michael Silverberg, Beckum, both of Fed. Rep. of Germany

[73] Assignee: Grundig E.M.V. Elektro-Mechanische Versuchsanstalt, Max Grundig Holland, Stiftung & Co. KG, Furth, Fed. Rep. of Germany

[21] Appl. No.: 319,009

[22] Filed: Mar. 3, 1989

[30] Foreign Application Priority Data

Mar. 5, 1988 [DE] Fed. Rep. of Germany ....... 3807248

[51] Int. Cl.$^5$ .............................................. H04N 9/64
[52] U.S. Cl. .................................. 358/31; 358/21 R; 358/23

[58] Field of Search ................... 358/21 R, 23, 24, 30, 358/31, 133, 140

[56] References Cited

U.S. PATENT DOCUMENTS

| 4,683,490 | 7/1987 | Strolle et al. | 358/31 |
| 4,742,386 | 5/1988 | Wilkinson | 358/23 |
| 4,766,484 | 8/1988 | Clayton et al. | 358/23 |

FOREIGN PATENT DOCUMENTS 0074893  4/1985  Japan.

Primary Examiner—Howard W. Britton
Assistant Examiner—Kim Yen Vu
Attorney, Agent, or Firm—Edward W. Goodman

[57] ABSTRACT

A color television transmission systems including three-dimensional filtering operations at the transmitter and receiver ends with the object of obtaining a lowest possible number of interferences in the form of cross color and cross-luminance on display in which each one of the two color difference signal channels has its own three-dimensional sub-filtering operation, wherein the two sub-filters are dimensioned differently.

9 Claims, 4 Drawing Sheets

METHOD OF AND ARRANGEMENTS FOR CODING AND DECODING COLOR TELEVISION SIGNALS USING A SEPARATE SERIES ARRANGEMENT OF A LOW-PASS FILTER AND A VERTICAL TEMPORAL FILTER FOR EACH COLOR DIFFERENCE SIGNAL

BACKGROUND OF THE INVENTION

1. Field of the Invention

The invention relates to an arrangement for coding color television signals comprising:
  means for providing a luminance signal and first and second color difference signals;
  a three-dimensional filter circuit coupled to receive said luminance signal, for providing a filtered luminance signal;
  first and second three-dimensional sub-filters, coupled to receive said first and second color difference signals, respectively, for providing filtered color difference signals, said first and second sub-filters each being constituted by a series arrangement of a low-pass filter and a combined vertical-temporal filter;
  a quadrature modulator for converting said filtered color difference signals into a modulated chrominance signal; and
  an adder circuit for adding together said filtered luminance signal and the modulated chrominance signal.

In addition, the invention relates to an arrangement for decoding color television signals including a luminance signal and a modulated chrominance signal, comprising:
  a quadrature demodulator for converting said modulated chrominance signal into first and second color difference signals,
  a three-dimensional filter circuit coupled to receive said luminance signal, and
  a three-dimensional filter circuit coupled to receive said first and second color difference signals.

The invention also relates to methods of transmitting color television signals using an arrangement for coding color television signals and an arrangement for decoding color television signals.

2. Description of Related Art

The periodical "Radio mentor", Vol. 12, 1969, pp. 847-851 discloses an arrangement for encoding color television signals in accordance with the PAL standard. In this prior art arrangement a notch filter is arranged in the path of the luminance signal. This notch filter has for its object to provide that at the receiver side on demodulation of the chrominance subcarrier luminance portions are not erroneously evaluated as chrominance signals, that is to say converted to a lower frequency and consequently produce low-frequency chrominance noise.

The periodical "Fernseh und Kinotechnik", 39th edition, Vol. 3, 1985, pp. 123-135 describes a digital PAL-Codec (PAL-coder and PAL-decoder) with improved luminance-chrominance separation. Using this digital PAL-codec disturbing cross-color and cross-luminance effects such as they occur in the PAL-codecs disclosed as prior art in said periodical, can be reduced or prevented. To achieve this, the article basically proposes to provide, in addition to the band limitation to approximately 5.5 MHz in the $f_x$ direction which is provided anyway, a combined vertical-temporal prefiltering and post-filtering operation. Together these measures result in a three-dimensional implementation of the luminance and chrominance signals such that both the luminance and also the chrominance components are allocated unambiguous positions in the three-dimensional frequency space, so that at the receiver side a highest possible error-free separation of the luminance and chrominance components is enabled.

In addition, the U.S.-4,683,490 discloses an arrangement for coding color television signals in a NTSC color television transmission system, in which inter alia a three-dimensional filter circuit is always arranged in the luminance channel and in the chrominance channels. The three-dimensional filter circuit in the chrominance channels comprises three-dimensional sub-filters, which are constituted by a series arrangement of a low-pass filter and a combined vertical-temporal filter.

SUMMARY OF THE INVENTION

Starting from this prior art, the invention has for its object to extend arrangements of the type defined in the introductory paragraphs and also to provide methods for the transmission of color television signals such that more attention is paid to the physiological aspects of the human eye.

In accordance with a first aspect of the invention, a color television signal coding apparatus as described in the preamble is therefore characterized in that the passband of the vertical-temporal filter coupled to receive said first color difference signal is less than the passband of the vertical-temporal filter coupled to receive said second color difference signal.

In accordance with a second aspect of the invention, a color television signal decoding apparatus as described in the preamble is therefore characterized in that said three-dimensional color difference signals filter circuit comprises first and second three-dimensional sub-filters being coupled to receive said first and second color difference signals, respectively, said first and second sub-filters being mutually different dimensioned.

Advantageous embodiments of the invention are described in the respective subclaims.

The advantages of the invention are more specifically that—because of the separate three-dimensional filtering of the color difference signals—each of these components can be transmitted with a resolution which is the optimum resolution for the instantaneous components. Further advantageous properties of the invention will become apparent from the description of the invention with reference to FIGS. 1-7, wherein, in addition to the described use in a PAL-colour television transmission system, use e.g. in a NTSC color television transmission system is possible too.

DESCRIPTION OF THE PREFERRED EMBODIMENT

Figure 1:
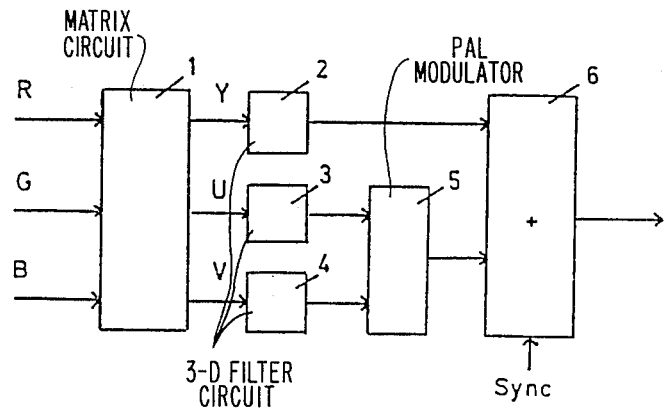
FIG. 1 is a basic circuit diagram of an arrangement for encoding color television signals in accordance with the invention.

FIG. 1 is a basic circuit diagram of an arrangement for encoding color television signals in accordance with the invention. RGB signals produced in a color television camera are present at the input of the arrangement. In a matrix circuit 1 a luminance signal Y, a first color difference signal U and a second color difference signal V are produced from these RGB signals. The luminance signal Y is applied to a three-dimensional filter circuit 2 which is arranged in the luminance channel and whose mode of operation will be described in detail with reference to FIG. 3. The three-dimensionally filtered luminance signal is applied to an input of an adder circuit 6.

The first color difference signal U is applied to a three-dimensional filter circuit 3, whose mode of operation will be described in greater detail with reference to the FIGS. 2a, c and d. The three-dimensionally filtered color difference signal U is applied to a PAL modulator 5.

The second color difference signal V is applied to a three-dimensional filter circuit 4, whose mode of operation will be described in greater detail with reference to the FIGS. 2b, c and d. The three-dimensionally filtered color difference signal V is also applied to the PAL modulator 5.

In the PAL modulator 5, the three-dimensionally filtered color difference signals U and V are converted into a modulated chrominance signal in a basically known manner. This chrominance signal is applied to a further input of the adder circuit 6, in response to which a color television signal coded in compliance with the PAL standard is available.

Figure 2A:
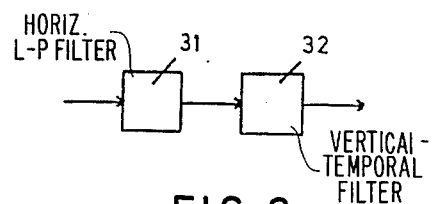
FIG. 2a is a more detailed representation of the three-dimensional sub-filter 3 of FIG. 1.

FIG. 2a is a more detailed representation of the three-dimensional sub-filter 3 of FIG. 1. The sub-filter 3 is formed by a series arrangement of a horizontal low-pass filter 31 and a combined vertical-temporal filter 32. The color difference signal U is limited in the horizontal low-pass filter 31 in the horizontal direction to 1.3 MHz. In the vertical-temporal filter 32, the horizontally band-limited color difference signal is band-limited in the $f_y$, $f_t$ plane.

This band limitation can be obtained either by a planar (real two-dimensional) filtering operation or by cascading two unidimensional filters which diagonally operate in the $f_y$, $f_t$ plane. FIG. 2c illustrates an example for the mode of operation of such filters. The hatched regions correspond to the pass-band regions.

In an alternative embodiment, the mentioned band limitation can also be obtained by cascading a filter operating in the vertical direction only, and a vertical-temporal diagonally operating filter. FIG. 2d illustrates an example for the mode of operation of such filters. The hatched regions correspond again to the pass-band regions.

Figure 2B:
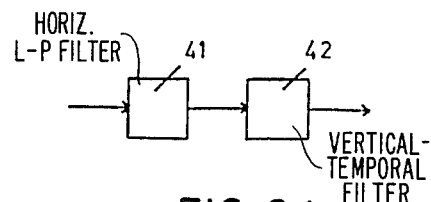
FIG. 2b is a more detailed representation of the three-dimensional sub-filter 4 of FIG. 1.
Figure 2:
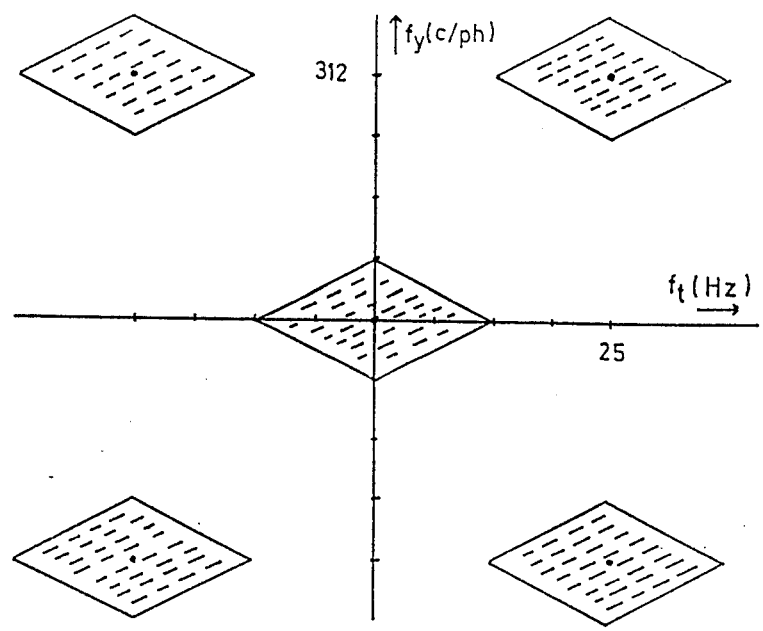
FIG. 2c is a first example for the basic mode of operation of the filter 32 of FIG. 2a or the filter 42 of FIG. 2b, respectively.
FIG. 2d is a second example for the basic mode of operation of the filter 32 of FIG. 2a or the filter 42 of FIG. 2b, respectively.
Figure 2:
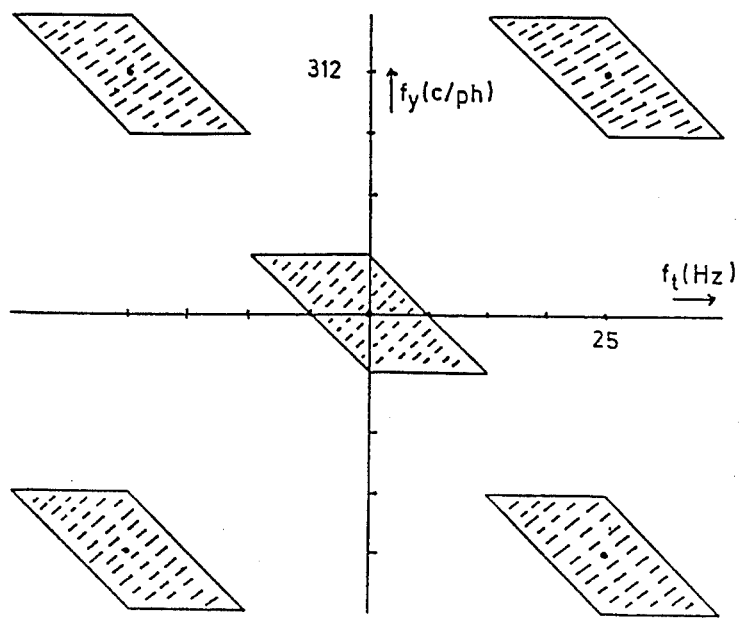

FIG. 2b is a more detailed representation of the three-dimensional sub-filter 4 of FIG. 1. The sub-filter 4 is formed by a series arrangement of a horizontal low-pass filter 41 and a combined vertical-temporal filter 42. In the horizontal low-pass filter 41, the color difference signal V is band limited in the horizontal direction to 1.3 MHz. The horizontally band-limited color difference signal is band-limited in the $f_y$, $f_t$ plane in the vertical-temporal filter 42. This band-limitation can be achieved by means of filters whose basic mode of operation corresponds to the mode of operation of the filters shown in FIGS. 2c and 2d.

It is a characterizing feature of the invention that the pass-bands of the vertical-temporal filter 32 for the horizontally band-limited color difference signal U is chosen to be smaller than the pass-bands of the vertical-temporal filter 42 for the horizontally band-limited color difference signal V. The reason for this measure is that the human eye is substantially less sensitive to motion blur as regards the color difference signal U than for motion blur as regards the color difference signal V. In other words, this means that the color difference signal V is transmitted with a higher resolution (or greater bandwidth, respectively) in the temporal direction than the color difference signal U. The three-dimensional frequency space to be created for the color difference signal U by means of the three-dimensional filtering operation is consequently less than the frequency space created for the color difference signal V. In a graphic representation this means that the hatched areas in the respective FIGS. 2c and 2d for the U-components of the chrominance information is less than those for the V-components.

The frequency space fixedly assigned to the color difference signals by means of the filters 31, 32, 41 and 42 described, must now be released in the luminance signal. This is also effected by means of a three-dimensional filtering operation with the aid of a filter 2 whose structure is shown in greater detail in FIG. 3.

Figure 3:
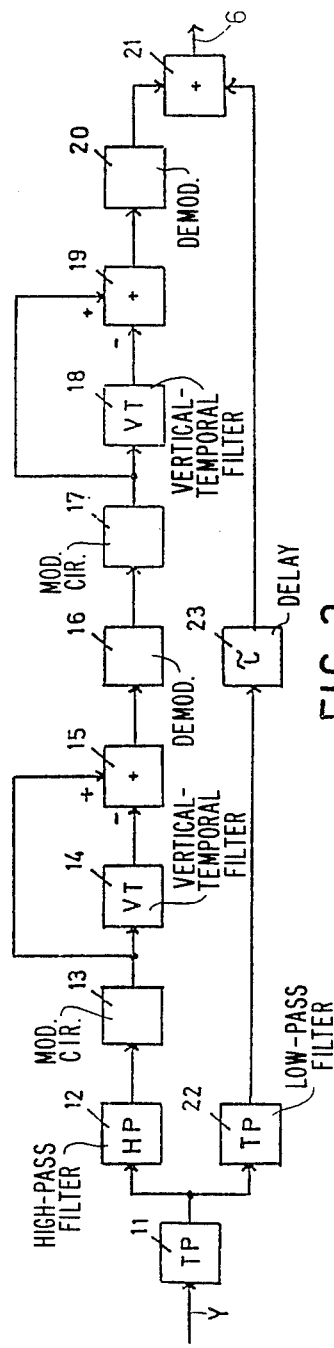
FIG. 3 is a more detailed representation of the three-dimensional filter circuit 2 of FIG. 1.

The luminance signal Y generated in the matrix 1 (see FIG. 1) is applied to the input of the filter shown in FIG. 3. This luminance signal is first band-limited in the horizontal direction to 6 MHz. The 6 MHz band-limited signal is split into a portion whose frequencies extend from 0–3.6 MHz (low-pass filter 22), and a portion whose frequencies extend from 3.6–6.0 MHz (high-pass filter 12).

The latter, higher frequency portions of the luminance signal are subjected to a vertical-temporal filtering operation, which proceeds in the following detailed manner: the luminance signal portions having the higher frequencies are first applied to first circuit means 13, 14, 15, 16 in which they are subjected to a vertical-temporal filtering operation which is the inverse of the vertical-temporal filtering operation of the first color difference signal U. As a result thereof, any luminance components are removed in the three-dimensional frequency space from the locations assigned to the first color difference signal U by the three-dimensional filtering operation in filter 3 (see FIG. 1). To that end the higher-frequency luminance signal portions are also modulated in a modulator circuit 13, in the same way as the color difference signal U in the PAL-modulator 5. For this U-modulation of the higher-frequency luminance signal portions a modified carrier frequency is used having the following properties:

- in the $f_y$, $f_t$-planes it effects the same shifts as in the chrominance sub-carrier used in the customary PAL-coders;
- in the $f_x$-direction it has a frequency which exceeds the highest horizontal frequency of the luminance components. Thus, it is achieved that no aliasing occurs for horizontal frequencies. In a graphic representation, the higher-frequency luminance portions are shifted by the modulation with the carrier frequencies in such a manner that the "spectral gaps" to be created in the luminance signal are centred around the origin. Then a filtering operation is effected which is the inverse of the three-dimensional filtering of the color difference signal U, in that the output signal of the modulator 13 is subjected in the vertical-temporal filter 14 to the same vertical-temporal filtering operation as the color difference signal U in the vertical-temporal filter 32 and is subsequently subtracted from the output signal of the modulator 13 in an adder stage 15. The output signal of the adder stage 15 is subjected in a demodulator 16 to a processing operation which is the opposite of the processing operation of the modulator 13, and is thereby again moved to the higher-frequency luminance signal range.

The output signal of the demodulator 16 is now accurately band-limited in the three-dimensional frequency space to those spaces which are not occupied by the color difference signal U.

The output signal of the demodulator 16 must now be subjected to a further vertical-temporal filtering operation, to release precisely those spaces which were assigned to the second color difference signal V by its three-dimensional filtering operation in the filter 4.

To that end, the output signal of the demodulator 16 is applied to second circuit means 17, 18, 19, 20, in which it is subjected to a vertical-temporal filtering which is the inverse of the vertical-temporal filtering operation of the second color difference signal V. In a modulator circuit 17 the output signal of the demodulator 16 is modulated in the same manner as the color difference signal V was modulated in the PAL-modulator 5. The modified carrier frequency used in this modulation has the same properties as the above-described modified carrier frequency. Represented graphically, the output signal of the demodulator 16 is shifted such by the modulation with the modified carrier frequency, that the "spectral gaps" to be created in the luminance signal are folded-back in the proximity of the origin. Then a filtering operation is effected which is the inverse of the three-dimensional filtering of the color difference signal V, in that the output signal of the modulator 17 in the vertical-temporal filter 18 is subjected to the same vertical-temporal filtering operation as the color difference signal V in the vertical-temporal filter 42 and is subsequently subtracted from the output signal of the modulator 17 in an adder stage 19. The output signal of the adder stage 19 is subjected in a demodulator 20 to a processing operation which is the opposite of the processing operation in the modulator 17, and is thereby again moved to the higher-frequency luminance signal range. The output signal of the demodulator 20 is now accurately band-limited in the three-dimensional frequency space to the spaces not occupied by the color difference signals U and V.

This object might also have been achieved in an alternative manner as regards the embodiment described, when the series arrangement of the first (13, 14, 15, 16) and the second (17, 18, 19, 20) circuit means were interchanged, i.e. when first the free spaces for the V-component and then the free spaces for the U-component of the chrominance information were created in the luminance signal.

The output signal of the demodulator 20 is added in an adder stage 21 to the delayed low-frequency luminance signal portion (delay member 23). The three-dimensionally filtered luminance signal is available at the output of the adder stage 21. This luminance signal is applied to the adder stage 6 (see FIG. 1) and is there added to the chrominance signal to form a standard-PAL signal which is then transmitted over the transmission channel.

Now the processing of the transmitted PAL signals at the receiver side will be described in greater detail with reference to the FIGS. 4-6.

Figure 4:
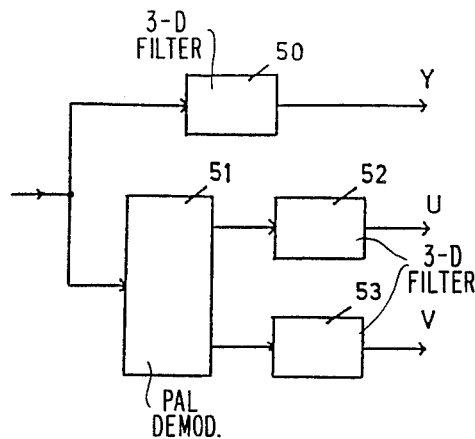
FIG. 4 is a basic circuit diagram of an arrangement for decoding color television signals in accordance with the invention.

FIG. 4 shows a basic circuit diagram of an arrangement for decoding PAL-color television signals according to the invention. The PAL-color television signal transmitted over the transmission channel is present at the input. This signal is applied to a three-dimensional filter circuit 50, whose mode of operation will be described in detail with reference to FIG. 6, and also to a customary PAL demodulator 51.

A first output signal of the PAL demodulator 51 is applied to a three-dimensional filter circuit 52, a detailed description of whose mode of operation will be given with reference to FIG. 5a.

A second output of the PAL demodulator 51 is applied to a three-dimensional filter circuit 53, whose mode of operation will be described in greater detail with reference to FIG. 5b.

Figure 5A:
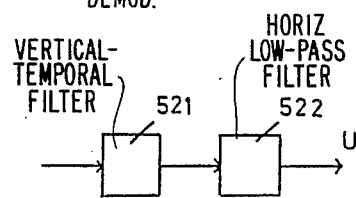
FIG. 5a is more a detailed representation of the three-dimensional sub-filter 52 of FIG. 4.

FIG. 5a is a more detailed representation of the three-dimensional sub-filter 52 of FIG. 4. The sub-filter 52 is formed by a series arrangement of a combined vertical-temporal filter 521 and a horizontal low-pass filter 522. The combined vertical-temporal filter 25 is of identical structure and dimensions as the combined vertical-temporal filter 32 at the transmitter end. In the horizontal low-pass filter 522 the output signal of the vertical-temporal filter 521 is band-limited to 0.7 MHz.

Figure 5B:
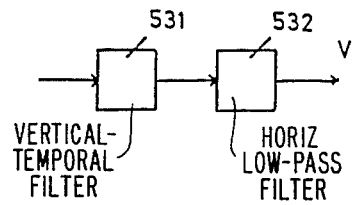
FIG. 5b is a more detailed representation of the three-dimensional sub-filter 53 of FIG. 4.

FIG. 5b is a more detailed representation of the three-dimensional sub-filter 53 of FIG. 4. The sub-filter 53 is formed by a series arrangement of a combined vertical-temporal filter 531 and a horizontal low-pass filter 532. The combined vertical-temporal filter 531 is of identical structure and dimensions as the combined vertical-temporal filter 52 at the transmitter end. In the horizontal low-pass filter 532 the output signal of the vertical-temporal filter 531 is band-limited to 0.7 MHz.

The above-described band limitation of the color difference signals in the horizontal direction can be effected to 0.7 MHz (or 700 kHz), because the resolution in the horizontal direction thus achieved for the color difference signals obtained at the output of the horizontal low-pass filter 522 or 532, respectively, is sufficient for the human eye. This band limitation to 0.7 MHz also determines that at the transmitter and the receiver sides, the spectral free spaces in the luminance signal must only be created for luminance signal frequencies located above 3.6 MHz.

Figure 6:
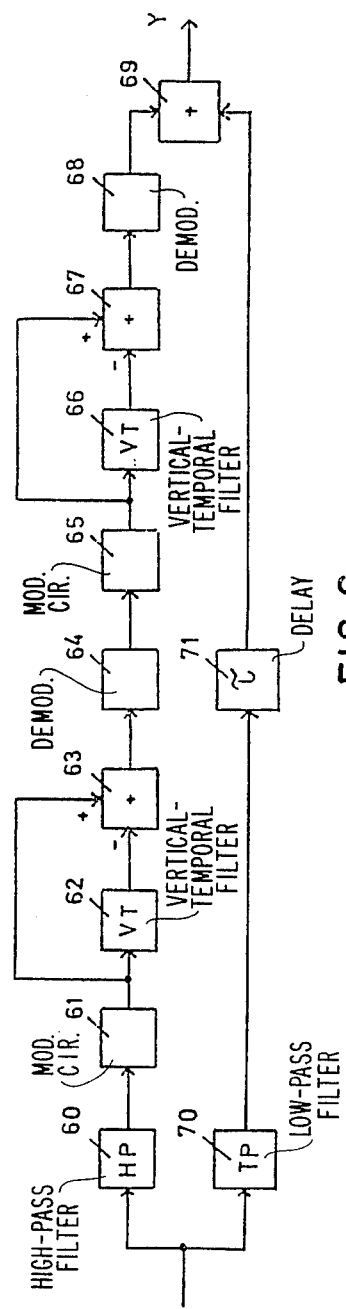
FIG. 6 is a more detailed representation of the three-dimensional filter circuit 50 of FIG. 4.

FIG. 6 is a detailed representation of the three-dimensional filter circuit 50 of FIG. 4. The PAL color television signal transmitted via the channel and whose band is limited in the horizontal direction to 5 MHz because of the limited bandwidth of the transmission channel is applied to the input of this filter circuit. This signal is split into a portion whose frequencies extend from 0–3.4 MHz (low-pass filter 70), and a portion whose frequencies extend from 3.4–5 MHz (high-pass filter 60).

The last-mentioned, high-frequency portions are subjected to a vertical-temporal filtering operation with the aid of first circuit means 61, 62, 63, 64 and second circuit means 65, 66, 67, 68. The first and the second circuit means, respectively, are of an identical structure as the respective first and second circuit means 13, 14, 15, 16 and 17, 18, 19, 20 used at the transmitter end. The dimensioning of the vertical-temporal filter at the receiver end may however be modified compared to the vertical-temporal filter used at the transmitter end. As a result thereof, a loss in motional resolution caused by the transmitter filtering operation can again be compensated for. The vertical-temporal filtered output signal of the demodulator 68 is added in an adder stage 69 to the delayed (delay member 71) low-frequency luminance signal portion. The three-dimensionally filtered luminance signal is available at the output of the adder stage 69.

Transmission methods utilizing the filters described in the foregoing at the transmitter and/or receiver end are described hereinafter.

In a first method, a coder of a structure in accordance with the first aspect of the invention is used at the transmitter end. If, at the receiver side, a color television receiver is used which includes a customary decoder, then an overall reduction in cross-color and cross-luminance is obtained compared with transmission methods using customary coders and decoders.

In a second method, a customary coder is used at the transmitter end, and a color television receiver having a decoder of a structure in accordance with the second aspect of the invention is used at the receiver end. Also in a transmission method of this type, an overall reduction in cross-color and cross-luminance is obtained compared with transmission methods using customary coders and decoders.

In a third method, a coder of a structure in accordance with the first aspect of the invention is used at the transmitter end, and a decoder of a structure in accordance with the second aspect of the invention is used at the receiver end. In this method neither cross-color nor cross-luminance interferences occur in the receiver. In addition, the horizontal resolution for the luminance signal is 5 MHz and is not—as in customary systems—limited to, for example, 3.9 MHz.

Figure 7:
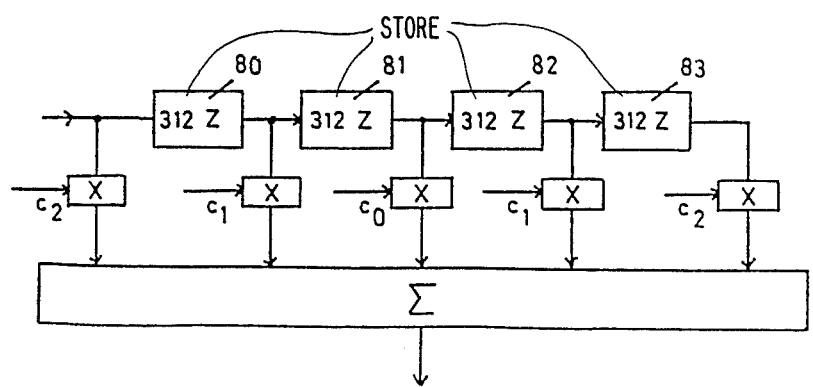
FIG. 7 shows an example for the realization of a combined vertical-temporal filter.

An example for an implementation of a combined vertical-temporal filter is shown in FIG. 7. It basically consists of 4 store units 80–83, in each of which the input signal is delayed by 312 lines, 5 multipliers in which the undelayed input signal is multiplied by a coefficient $C_2$, the signal delayed by 312 lines is multiplied by a coefficient $C_1$, the signal delayed by 624 lines is multiplied by a coefficient $C_0$, the signal delayed by 936 lines is multiplied by a coefficient $C_1$, and the signal delayed by 1248 lines is multiplied by a coefficient $C_2$, and an adder stage in which the output signals of the 5 multipliers are added together.

We claim:

1. An arrangement for coding color television signals, comprising:
    means for providing a luminance signal and first and second color difference signals;
    a three-dimensional filter circuit coupled to receive said luminance signal, for providing a filtered luminance signal;
    first and second three-dimensional sub-filters coupled to receive said first and second color difference signals, respectively, for providing filtered color difference signals, said first and second sub-filters each being constituted by a series arrangement of a low-pass filter and a combined vertical-temporal filter;
    a quadrature modulator for converting said filtered color difference signals into a modulated chrominance signal; and
    an adder circuit for adding together said filtered luminance signal and the modulated chrominance signal;

characterized in that the passband of the combined vertical-temporal filter coupled to receive said first color difference signal is less than the passband of the combined vertical-temporal filter coupled to receive said second color difference signal.

2. An arrangement as claimed in claim 1, characterized in that the three-dimensional filter circuit coupled to receive said luminance signal comprises a low-pass filter and a further combined vertical-temporal filter.

3. An arrangement as claimed in claim 2, characterized in that only high frequency luminance signal portions are applied to the further combined vertical-temporal filter.

4. An arrangement as claimed in claim 3, characterized in that the further combined vertical-temporal filter comprises:
    first circuit means, in which said high frequency luminance signal portions are subjected to a vertical-temporal filtering operation, which is the inverse of the operation of the combined vertical-temporal filter of one of said color difference signals, and
    second circuit means, in which output signals of the first circuit means are subjected to a vertical-temporal filtering operation which is the inverse of the operation of the combined vertical-temporal filter of the other one of said color difference signals.

5. An arrangement for decoding color television signals including a luminance signal and a modulated chrominance signal, comprising:
    a quadrature demodulator for converting said modulated chrominance signal into first and second color difference signals,
    a three-dimensional filter circuit coupled to receive said luminance signal, and
    a three-dimensional filter circuit coupled to receive said first and second color difference signals, characterized in that
    said three-dimensional filter circuit coupled to receive said first and second color difference signals filter circuit comprises first and second three-dimensional sub-filters being coupled to receive said first and second color difference signals, respectively, said first and second 3-dimensional sub-filters being mutually different dimensioned.

6. An arrangement as claimed in claim 5, characterized in that said first and second 3-dimensional sub-filters are each constituted by a series arrangement of a combined vertical-temporal filter and a low-pass filter.

7. An arrangement as claimed in claim 6, characterized in that the passband of the combined vertical-temporal filter coupled to receive said first color difference signal is less than the passband of the combined vertical-temporal filter coupled to receive said second color difference signal.

8. An arrangement as claimed in any one of the claims 5-7, characterized in that said three-dimensional filter circuit coupled to receive said luminance signal comprises a combined luminance vertical-temporal filter and means for applying only high frequency luminance signal portions to said combined luminance vertical-temporal filter.

9. An arrangement as claimed in claim 8, characterized in that said combined luminance vertical-temporal filter comprises:
 first circuit means, in which said high frequency luminance signal portions are subjected to a vertical-temporal filtering operation, which is the inverse of the vertical-temporal filtering of one of said color difference signals, and
 second circuit means, in which output signals of the first circuit means are subjected to a vertical-temporal filtering operation which is the inverse of the vertical-temporal filtering of the other one of said color difference signals.

* * * * *